US006547204B1

(12) United States Patent
Peck

(10) Patent No.: US 6,547,204 B1
(45) Date of Patent: Apr. 15, 2003

(54) SIGN HOLDING STAKE

(76) Inventor: Robert Peck, 7125 Brookhill Dr., Salt Lake City, UT (US) 84121

(*) Notice: Subject to any disclaimer, the term of this patent is extended or adjusted under 35 U.S.C. 154(b) by 0 days.

(21) Appl. No.: 10/132,488

(22) Filed: Apr. 24, 2002

(51) Int. Cl.$^{7}$ ................................................ F16M 13/00
(52) U.S. Cl. .......................................... 248/545; 40/607
(58) Field of Search ................................ 248/545, 156, 248/441.1, 127, 146, 158; 40/611, 607, 606, 610

(56) References Cited

U.S. PATENT DOCUMENTS

| | | | | | |
|---|---|---|---|---|---|
| D247,265 | S | | 2/1978 | Ledebuhr | D96/12 A |
| 4,232,467 | A | | 11/1980 | Stewart | 40/607 |
| 4,894,937 | A | | 1/1990 | Davis | 40/606 |
| 4,910,902 | A | | 3/1990 | Anderson | 40/607 |
| 4,946,039 | A | | 8/1990 | Garran | 206/575 |
| 5,058,300 | A | * | 10/1991 | Ernest et al. | 40/606 |
| 5,083,390 | A | * | 1/1992 | Edman | 40/606 |
| 5,181,335 | A | * | 1/1993 | Todd | 40/607 |
| 5,566,914 | A | | 10/1996 | Thomas | 248/156 |
| 5,615,503 | A | * | 4/1997 | Current | 40/601 |
| 6,068,233 | A | | 5/2000 | Green | 248/548 |
| 6,298,592 | B1 | * | 10/2001 | Baier | 40/611 |
| 6,338,211 | B1 | | 1/2002 | Carney | 40/124.5 |

* cited by examiner

*Primary Examiner*—Ramon O. Ramirez
*Assistant Examiner*—Kofi Schulterbrandt
(74) *Attorney, Agent, or Firm*—Lloyd W. Sadler

(57) ABSTRACT

A stake for holding a sign upright and comprising at least two leg elements, one end of which is adapted for inserting into the ground, and the other end of which is bent into a shape for compressively or frictionally holding the sign in place above the ground. Cross bar support members and connecting portions are provided to give stability to the stake.

8 Claims, 12 Drawing Sheets

SIGN HOLDING STAKE

BACKGROUND OF INVENTION

1. Field of the Invention

This invention relates to stakes for holding signs. More specifically, this invention relates to stakes for holding signs that provide one or more retention members integrated as a part of the stake.

2. Description of Related Art

A variety of devices have been used, proposed or are well known for holding signs. Typically signs have been stapled or nailed to wooden stakes, which are driven into the ground. Some stakes have been described that use alternating vertical wire extensions to hold the sign in place. Both such devices have been found to be susceptible to wind and other weather effects, which tend to cause the sign to become disengaged from the stake, thereby destroying the very purpose of the device. Other prior sign stakes are complex mechanical devices, which have a substantial number of component parts or which require substantial machining. Such stakes, because of their cost, are not useful in a low-cost disposable sign, minimal assembly use.

The reader is referred to the following U.S. patent documents for general background material, although they may not necessarily constitute prior art to this invention. Each of these patents is hereby incorporated by reference in its entirety for the material contained therein.

U.S. Pat. No. 4,232,467 describes a sign support stake, whose main component takes the form of an elongated, sheet material member, which has a hat-shaped configuration in cross-section.

U.S. Pat. No. 4,894,937 describes a stake for holding a sign upright and comprising at least two parallel and spaced-apart elongate legs, one end of which legs for being driven into the ground and the other end of which legs for supporting a sign above the ground, and at least two longitudinally spaced-apart cross-members secured to and connected the legs together.

U.S. Pat. No. 4,910,902 describes a stake that is drivable into the ground for holding a sign post. The stake has a clamp at its upper end so that the stake can be driven into the ground, then a conventional sign post can be clamped for support.

U.S. Pat. No. 4,946,039 describes a sign display kit that includes a flexible transparent waterproof plastic container, which contains the other materials in the kit; i.e., a sign, a stake, a rubber band for mounting the sign on the stake, and optionally one or more rubber balloons.

U.S. Pat. No. 5,566,914 describes a sign support stake that may be combined with a jack for extraction of the stake.

U.S. Pat. No. 6,068,233 describes a multi-section support post for a reflective, roadway delineator that collapses upon impact at a replaceable joint.

U.S. Pat. No. 6,338,211 describes a memorial marker that includes a cap, that is attached to the uppermost end of a rod and is a conventionally-oriented five point star that has a pair of lowermost pointed arms that depend skewly outwardly from the rod, and which equidistantly straddle, and clear, the uppermost end of the rod.

SUMMARY OF INVENTION

It is desirable to provide a sign stake that provides increased sign holding ability, even under adverse weather conditions, and that is a low cost mechanical structure that requires no assembly.

Therefore, it is an object of this invention to provide a sign stake that has a tension clamping structure for holding the sign in place.

It is a further object of this invention to provide a sign stake that is a single piece wire-like construction.

It is a still further object of this invention to provide a sign stake that is adapted to be easily installed in the ground, generally without the use of tools.

Another object of this invention is to provide a sign stake that, in various embodiments, is compatible with a variety of sign sizes and materials.

Additional objects, advantages and other novel features of this invention will be set forth in part in the description that follows and in part will become apparent to those skilled in the art upon examination of the following or may be learned with the practice of the invention. The objects and advantages of this invention may be realized and attained by means of the instrumentalities and combinations particularly pointed out in the appended claims. Still other objects of the present invention will become readily apparent to those skilled in the art from the following description wherein there is shown and described present embodiments of the invention, simply by way of illustration of some of the modes best suited to carry out this invention. As it will be realized, this invention is capable of other different embodiments, and its several details, and specific structural components are capable of modification in various aspects without departing from this invention. Accordingly, the drawings and descriptions should be regarded as illustrative in nature and not as restrictive.

To achieve the foregoing and other objectives, and in accordance with the purposes of the present invention, a sign stake is provided with two or more legs capable of being inserted into the ground, two or more clamping sections capable of holding a sign in place and one or more structural elements holding the legs and the clamping sections together.

BRIEF DESCRIPTION OF DRAWINGS

The accompanying drawings incorporated in and forming a part of the specification, illustrate several present embodiments of the present invention. Some, although not all, alternative embodiments are described in the following description.

In the drawings.

Reference will now be made in detail to the present embodiments of the invention, examples of which are illustrated in the accompanying drawings.

DETAILED DESCRIPTION

Figure 1A:
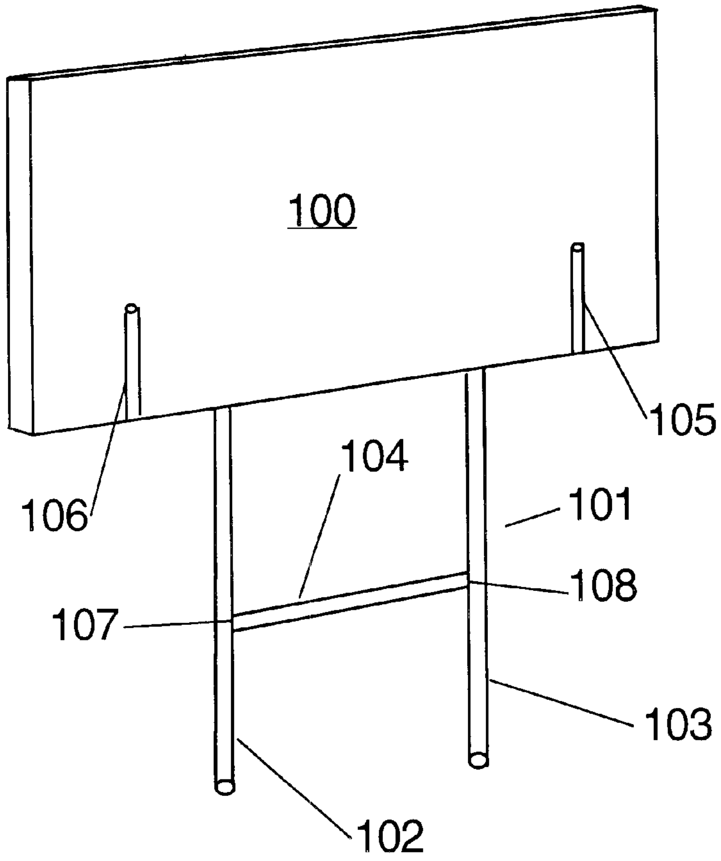
FIG. 1*a* is a front perspective view of a first embodiment of the invention, holding a typical sign.

FIG. 1*a* shows a front perspective view of a first embodiment 101 of the invention, holding a typical sign 100. In this embodiment of the invention 101 two leg elements 102, 103 are jointed together by a cross bar support 104. Although in this embodiment, the cross bar support 104 is shown as being a single bar extending generally horizontally, alternatives cross bar supports comprising one or more bars or sections extending horizontally or at an angle between the leg elements 102, 103 are envisioned as alternative cross bar supports. The cross bar support 104 is joined 107, 108 to the leg elements 102, 103 by a weld in the present embodiment, although alternative methods of joining such as adhesive, screws, bolt(s), clips and the like can be substituted without departing from the concept of this invention. Two holding portions 105, 106 are shown holding the sign 100 imposition. These holding portions 105, 106 are preferably extensions of the leg elements 102, 103, bent as show in further drawings in detail, to create a "clip-like" feature capable of hold a sign 100 in place. In the present embodiment of the invention the entire structure is composed of relatively small diameter, less than ½ inch, rod metal, typically steel, aluminum, iron or the like. In alternative embodiments of the invention, the structure of the invention may be composed of one or more materials including other metals and plastic and other synthetic composites. Similarly, while the sign stake of this invention 101 is presently sized as appropriate for relatively small, real estate or political sign sizes, in alternative embodiments, this invention may be sized as appropriate for much larger, or potentially smaller signs, such as bill boards and other commercial advertising signs. Although if the invention is sized for a billboard, clearly the diameter of the rod material used would be much larger than the less than ½ inch of the present embodiment.

Figure 1B:
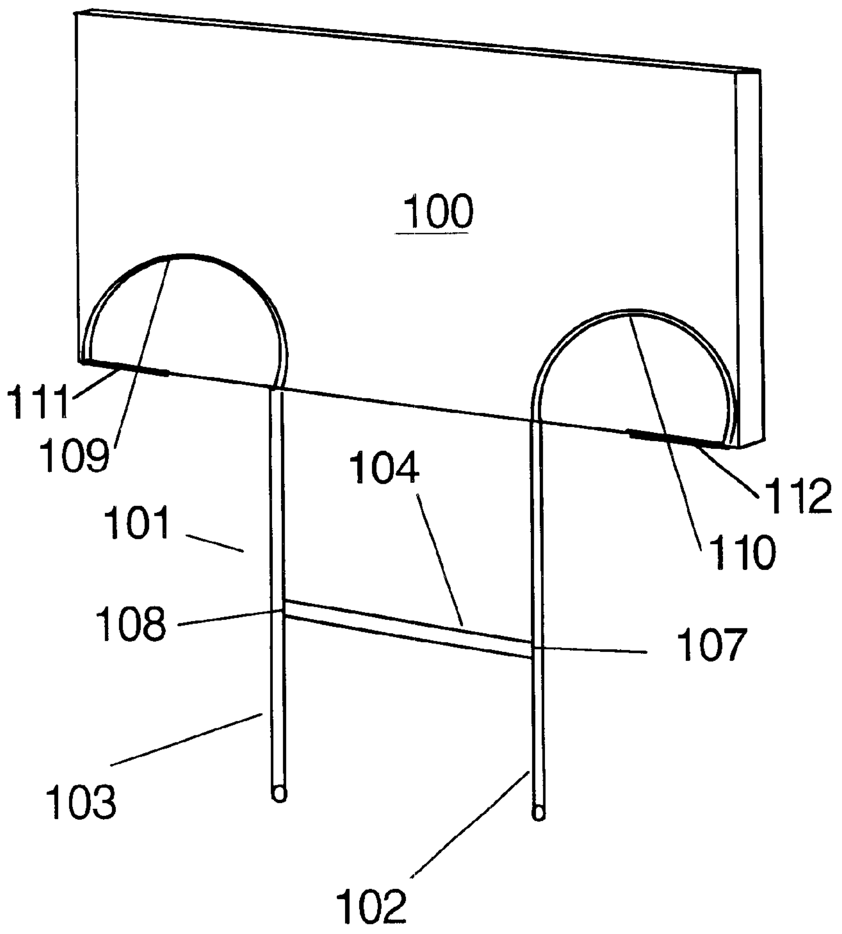
FIG. 1*b* is a rear perspective view of the first embodiment of the invention, holding a typical sign.

FIG. 1*b* shows a rear perspective view of the first embodiment 101 of the invention, holding a typical sign 100. This view, while continuing to show the leg elements 102, 103, also shows the rear of the holding elements consisting of a curved portion 109, 110 and a connecting portion 111, 112. As can be seen in this view, the curved portion 109, 110 is an extension of the leg portions 102, 103 and the connecting portion 111, 112 is an extension of the curved portion 109, 110. The connecting portion 111, 112, (as further shown in FIG. 2*a*) extends into the holding portions 105, 106, shown in FIG. 1*a*. The sign 100 is held in place in one of two manners. In particular, this invention 101 is especially well suited to holding the sign 100 by compressive force between the holding portions 105, 106 and the curve portions 109, 110. This compressive force is created, in the present embodiment by bending the metal portions of the extended legs 102, 103 to create the curved portions 109, 110, the connecting portions 111, 112 and the holding portions 105, 106. In alternative embodiments, the compressive force can be created by molding or use of an internal wire or the like. In alternative uses, with corrugated or like signs have measurable width, the holding portions 105, 106, may be inserted into the corrugated or like region of the sign thereby frictionally holding the sign 100 in place.

Figure 2A:
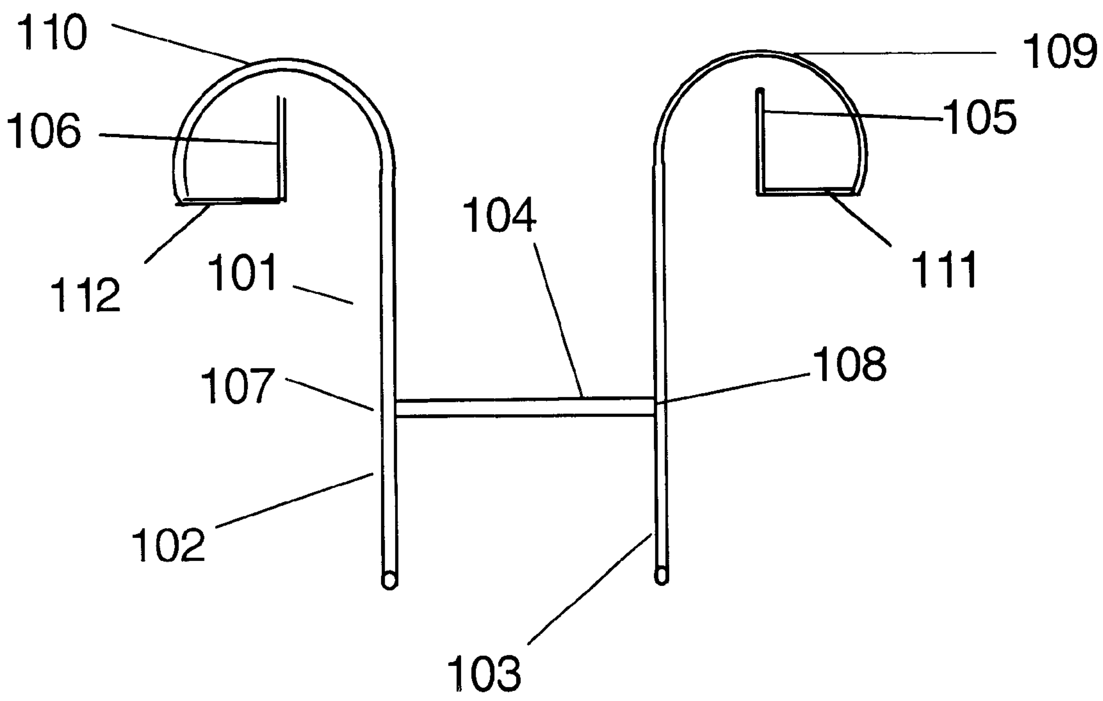
FIG. 2*a* is a front view of the first embodiment of the invention without showing a held sign.

FIG. 2*a* shows a front view of the first embodiment 101 of the invention without showing a held sign in order to show all of the elements as connected together. The leg portions 102, 103 are joined 107, 108 together by the cross bar support 104. The leg portions 102, 103 extend to curved portions 109, 110, which in turn extends to connecting portions 111, 112 and which extend to the holding portions 105, 106.

Figure 2B:
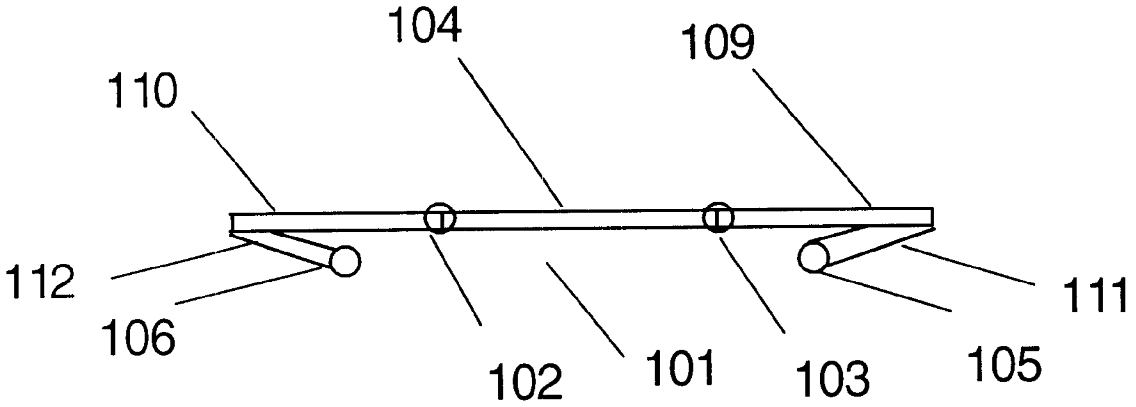
FIG. 2*b* is a top down view of the first embodiment of the invention without showing a held sign.

FIG. 2*b* is a top down view of the first embodiment 101 of the invention without showing a held sign. This view shows the relative positioning of the holding portions 105, 106 to the curved portions 109, 110 and shows the somewhat spring-like bend created in the curved portions 109, 110 with the connecting portions 111, 112 and the holding portions 105, 106. As noted above, the sign 100, shown in FIGS. 1*a* and 1*b*, typically is fitted between the holding portions 105, 106 and the curved portions 109, 110.

Figure 3A:
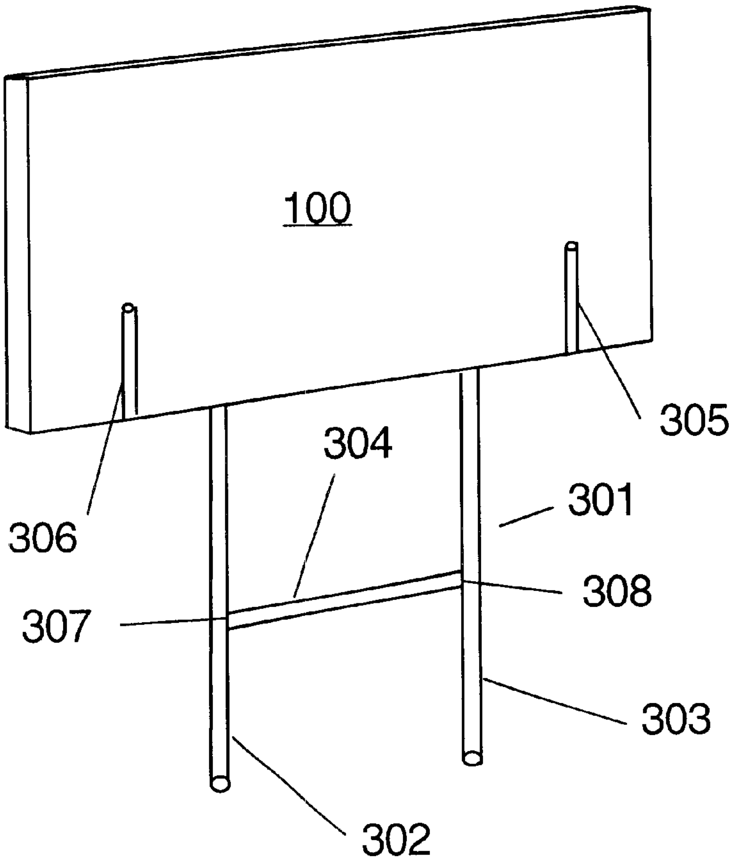
FIG. 3*a* is a front perspective view of a second embodiment of the invention, holding a typical sign.

FIG. 3*a* is a front perspective view of a second embodiment 301 of the invention, holding a typical sign 100. In this embodiment of the invention 301 two leg elements 302, 303 are jointed together by a cross bar support 304. Although in this embodiment, the cross bar support 304 is shown as being a single bar extending generally horizontally, alternatives cross bar supports comprising one or more bars or sections extending horizontally or at an angle between the leg elements 302, 303 are envisioned as alternative cross bar supports. The cross bar support 304 is joined 307, 308 to the leg elements 302, 303 by a weld in the present embodiment, although alternative methods of joining such as adhesive, screws, bolt(s), clips and the like can be substituted without departing from the concept of this invention. Two holding portions 305, 306 are shown holding the sign 100 in position. These holding portions 305, 306 are preferably extensions of the leg elements 302, 303, bent as show in further drawings in detail, to create a "clip-like" feature capable of hold a sign 100 in place. In the present embodiment of the invention the entire structure is composed of relatively small diameter, less than ½ inch, rod metal, typically steel, aluminum, iron or the like. In alternative embodiments of the invention, the structure of the invention may be composed of one or more materials including other metals and plastic and other synthetic composites. Similarly, while the sign stake of this invention 301 is presently sized as appropriate for relatively small, real estate or political sign sizes, in alternative embodiments, this invention may be sized as appropriate for much larger, or potentially smaller signs, such as bill boards and other commercial advertising signs. Although if the invention is sized for a billboard, clearly the diameter of the rod material used would be much larger than the less than ½ inch of the present embodiment.

Figure 3B:
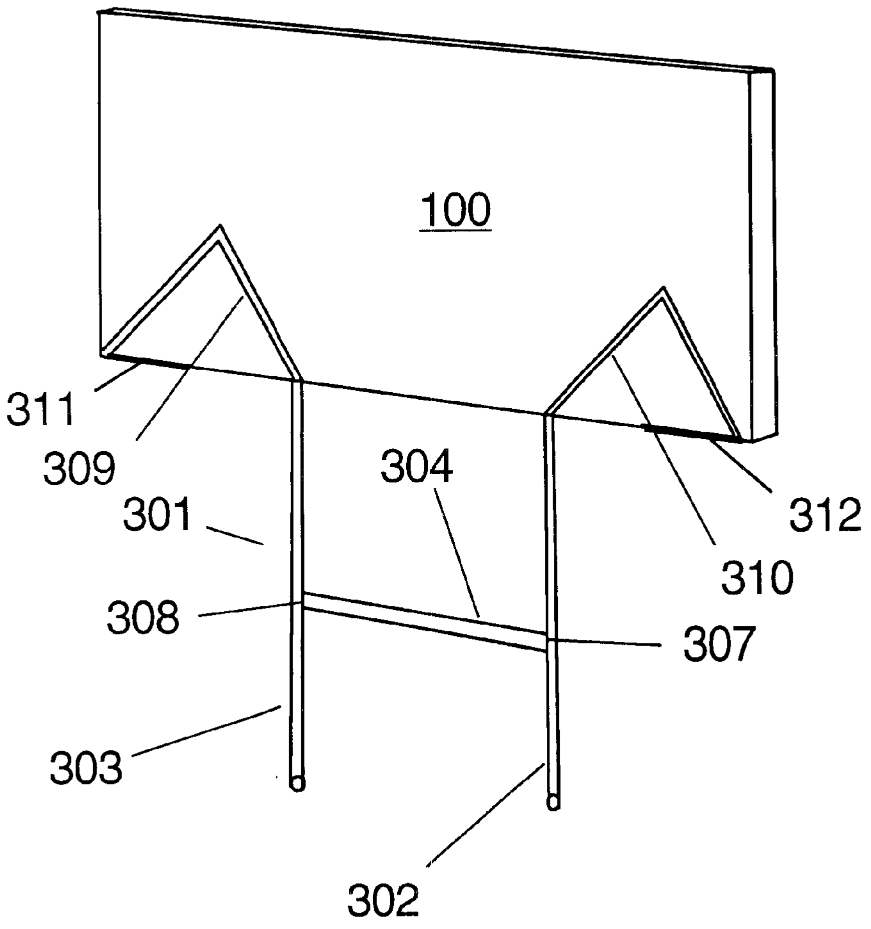
FIG. 3*b* is a rear perspective view of the second embodiment of the invention, holding a typical sign.

FIG. 3*b* is a rear perspective view of the second embodiment 301 of the invention, holding a typical sign 100. This view, while continuing to show the leg elements 302, 303, also shows the rear of the holding elements consisting of an angled portion 309, 310 and a connecting portion 311, 312. As can be seen in this view, the angled portions 309, 310 is an extension of the leg portions 302, 303 and the connecting portions 311, 312 are extensions of the angled portions 309, 310. The connecting portion 311, 312, (as further shown in FIG. 4*a*) extends into the holding portions 305, 306, shown in FIG. 3*a*. The sign 100 is held in place in one of two manners. In particular, this invention 301 is especially well suited to holding the sign 100 by compressive force between the holding portions 305, 306 and the angled portions 309, 310. This compressive force is created, in the present embodiment by bending the metal portions of the extended legs 302, 303 to create the angled portions 309, 310, the connecting portions 311, 312, and the holding portions 305, 306. In alternative embodiments, the compressive force can be created by molding or use of an internal wire or the like. In alternative uses, with corrugated or like signs have measurable width, the holding portions 305, 306, may be inserted into the corrugated or like region of the sign thereby frictionally holding the sign 100 in place.

Figure 4A:
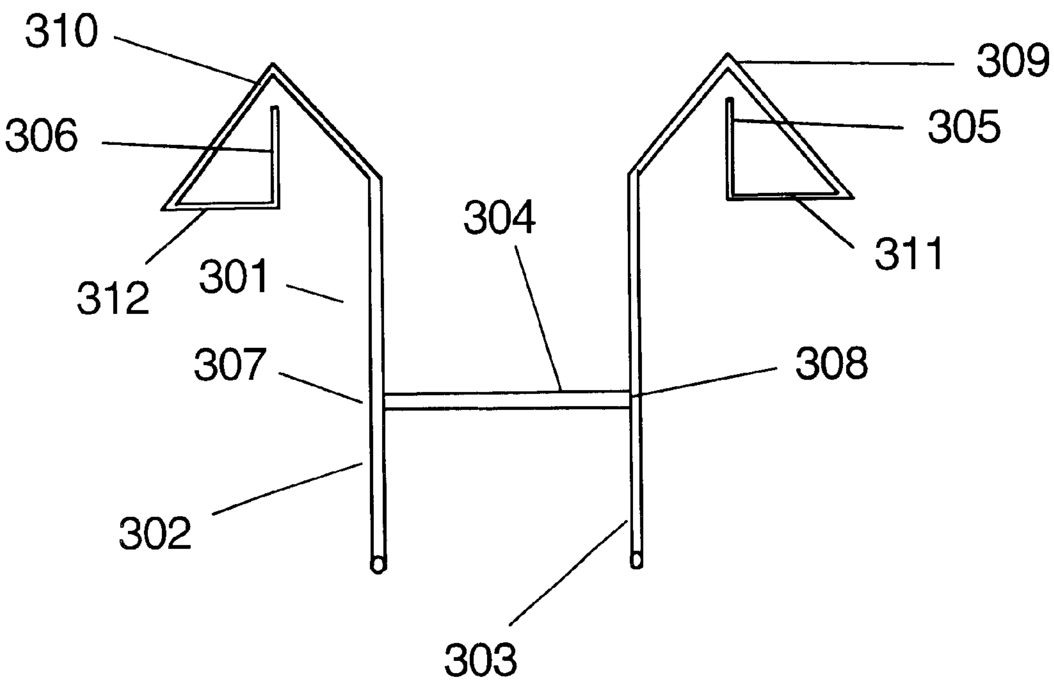
FIG. 4*a* is a front view of the second embodiment of the invention without showing a held sign.

FIG. 4*a* is a front view of the second embodiment of the invention 301 without showing a held sign in order to show all of the elements as connected together. The leg portions 302, 303 are joined 307, 308 together by the cross bar support 304. The leg portions 302, 303 extend to angled portions 309, 310, which in turn extends to connecting portions 311, 312 and which extend to the holding portions 305, 306.

Figure 4B:
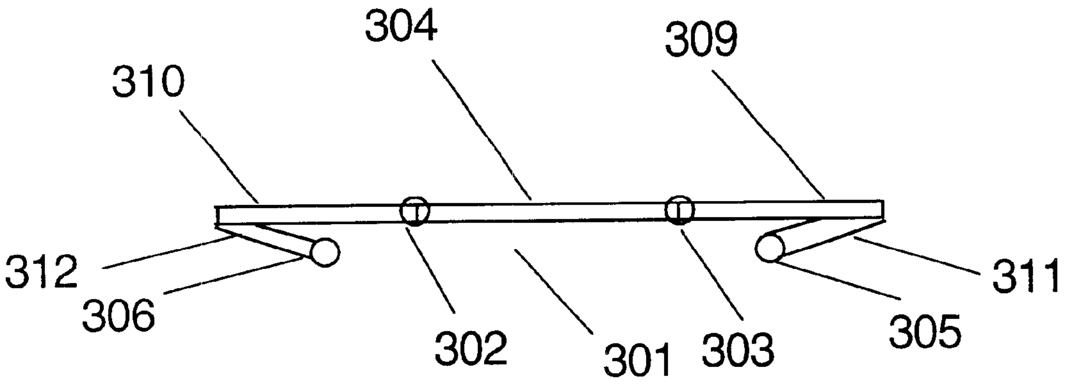
FIG. 4*b* is a top down view of the second embodiment of the invention without showing a held sign.

FIG. 4*b* is a top down view of the second embodiment 301 of the invention without showing a held sign. This view shows the relative positioning of the holding portions 305, 306 to the angled portions 309, 310 and shows the some-what spring-like bend created in the angled portions 309, 310 with the connecting portions 311, 312 and the holding portions 305, 306. As noted above, the sign 100, shown in FIGS. 3*a* and 3*b*, typically is fitted between the holding portions 305, 306 and the angled portions 309, 310.

Figure 5A:
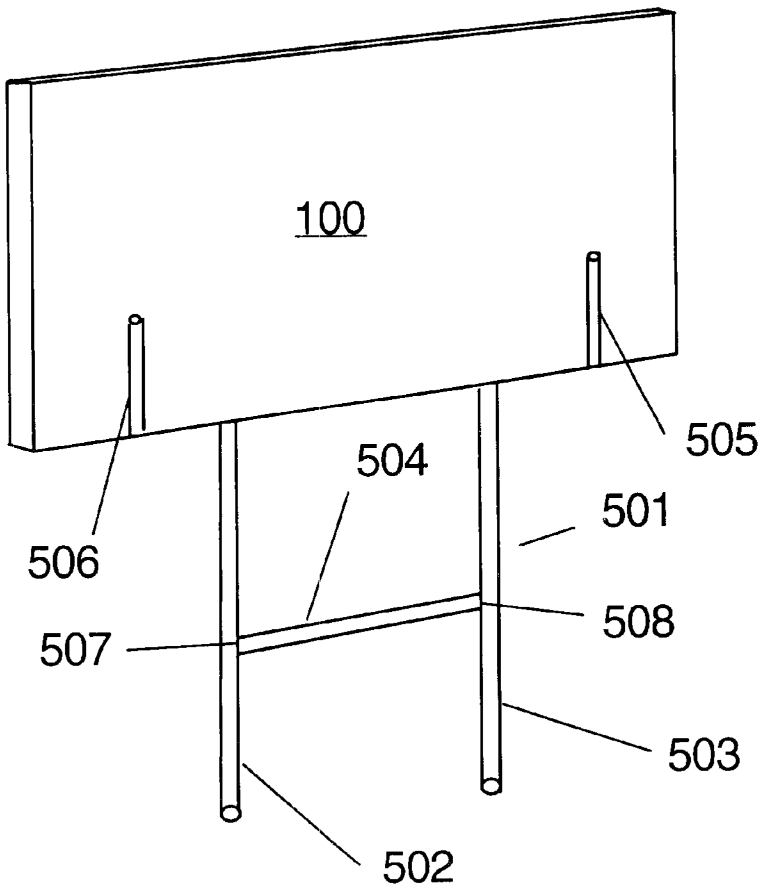
FIG. 5*a* is a front perspective view of a third embodiment of the invention, holding a typical sign.

FIG. 5*a* is a front perspective view of a third embodiment 501 of the invention, holding a typical sign 100. In this embodiment of the invention 501 two leg elements 502, 503 are jointed together by a cross bar support 504. Although in this embodiment, the cross bar support 504 is shown as being a single bar extending generally horizontally, alternatives cross bar supports comprising one or more bars or sections extending horizontally or at an angle between the leg elements 502, 503 are envisioned as alternative cross bar supports. The cross bar support 504 is joined 507, 508 to the leg elements 502, 503 by a weld in the present embodiment, although alternative methods of joining such as adhesive, screws, bolt(s), clips and the like can be substituted without departing from the concept of this invention. Two holding portions 505, 506 are shown holding the sign in position. These holding portions 505, 506 are preferably extensions of the leg elements 502, 503, bent as show in further drawings in detail, to create a "clip-like" feature capable of hold a sign 100 in place. In the present embodiment of the invention the entire structure is composed of relatively small diameter, less than ½ inch, rod metal, typically steel, aluminum, iron or the like. In alternative embodiments of the invention, the structure of the invention may be composed of one or more materials including other metals and plastic and other synthetic composites. Similarly, while the sign stake of this invention 101 is presently sized as appropriate for relatively small, real estate or political sign sizes, in alternative embodiments, this invention may be sized as appropriate for much larger, or potentially smaller signs, such as bill boards and other commercial advertising signs. Although if the invention is sized for a billboard, clearly the diameter of the rod material used would be much larger than the less than ½ inch of the present embodiment.

Figure 5B:
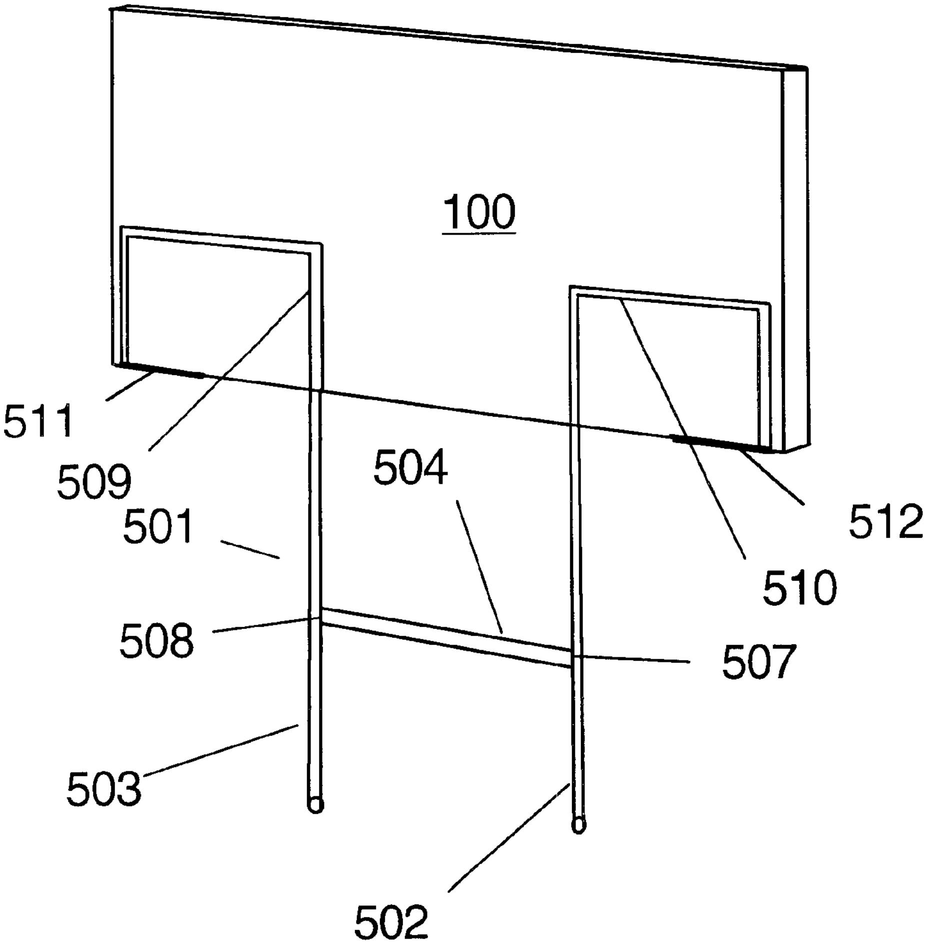
FIG. 5*b* is a rear perspective view of the third embodiment of the invention, holding a typical sign.

FIG. 5*b* is a rear perspective view of the third embodiment 501 of the invention, holding a typical sign 100. This view, while continuing to show the leg elements 502, 503, also shows the rear of the holding elements consisting of a double bent portion 509, 510 and a connecting portion 511, 512. As can be seen in this view, the double bent portion 509, 510 is an extension of the leg portions 502, 503 and the connecting portion 511, 512 is an extension of the double bent portion 509, 510. The connecting portion 511, 512, (as further shown in FIG. 5*a*) extends into the holding portions 505, 506, shown in FIG. 5*a*. The sign 100 is held in place in one of two manners. In particular, this invention 501 is especially well suited to holding the sign 100 by compressive force between the holding portions 505, 506 and the curve portions 509, 510. This compressive force is created, in the present embodiment by bending the metal portions of the extended legs 502, 503 to create the double bent portions 509, 510, the connecting portions 511, 512 and the holding portions 505, 506. In alternative embodiments, the compressive force can be created by molding or use of an internal wire or the like. In alternative uses, with corrugated or like signs have measurable width, the holding portions 505, 506, may be inserted into the corrugated or like region of the sign thereby frictionally holding the sign 100 in place.

Figure 6A:
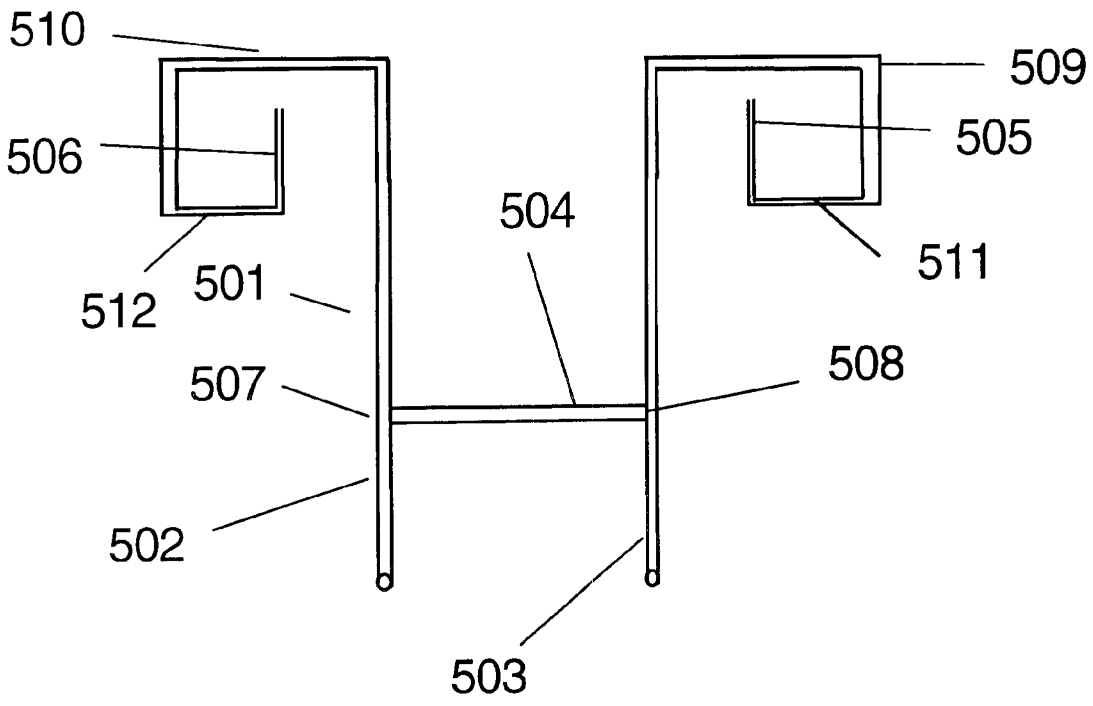
FIG. 6*a* is a front view of the third embodiment of the invention without showing a held sign.

FIG. 6*a* is a front view of the third embodiment 501 of the invention without showing a held sign in order to show all of the elements as connected together. The leg portions 502, 503 are joined 507, 508 together by the cross bar support 504. The leg portions 502, 503 extend to double bent portions 509, 510, which in turn extends to connecting portions 511, 512 and which extend to the holding portions 505, 506.

Figure 6B:
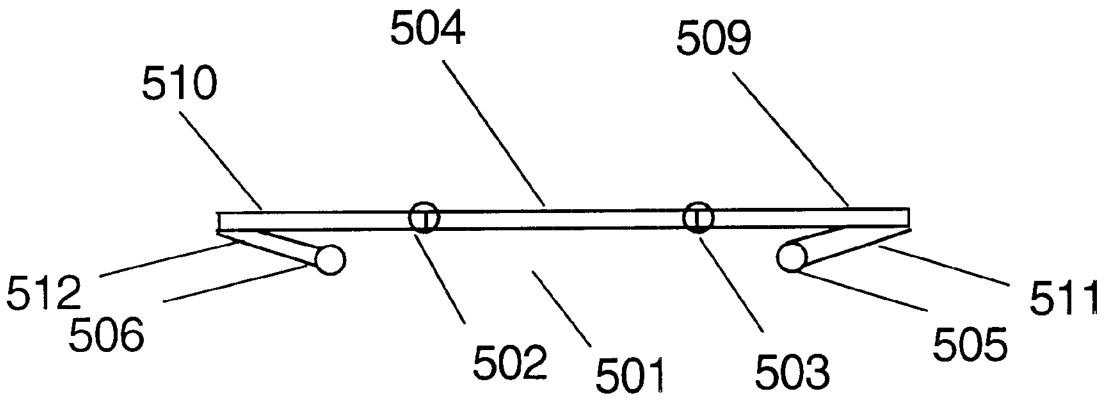
FIG. 6*b* is a top down view of the third embodiment of the invention without showing a held sign.

FIG. 6*b* is a top down view of the third embodiment 501 of the invention without showing a held sign. This view shows the relative positioning of the holding portions 505, 506 to the double bent portions 509, 510 and shows the some-what spring-like bend created in the double bent portions 509, 510 with the connecting portions 511, 512 and the holding portions 505, 506. As noted above, the sign 100, shown in FIGS. 5*a* and 5*b*, typically is fitted between the holding portions 505, 506 and the double bent portions 509, 510.

Figure 7A:
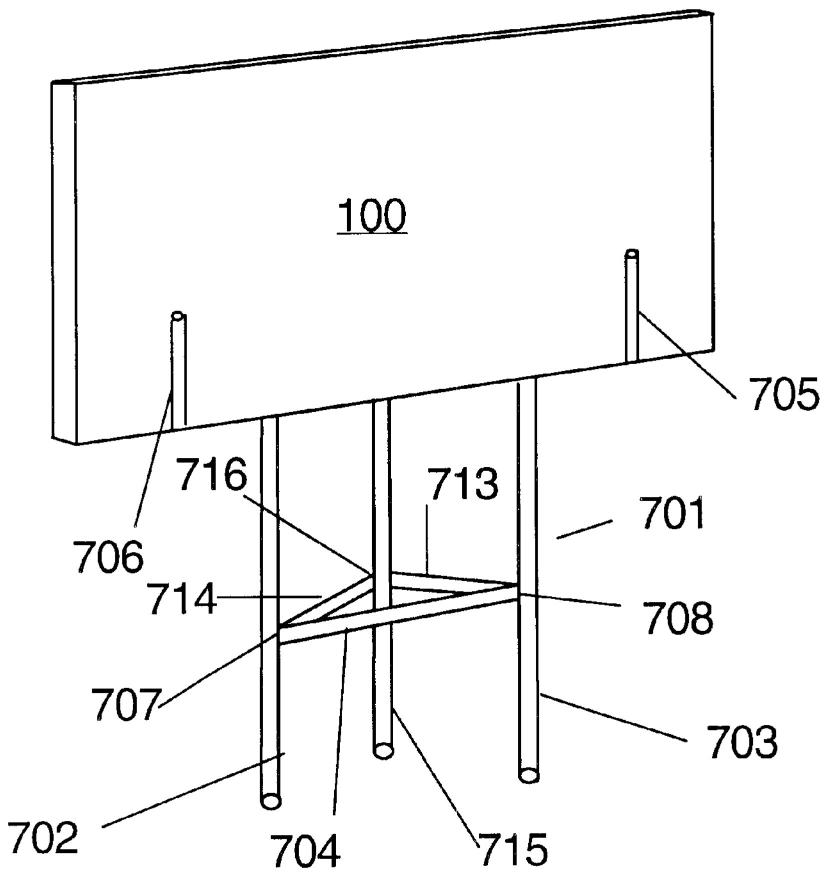
FIG. 7*a* is a front perspective view of a fourth embodiment of the invention holding a typical sign.

FIG. 7*a* is a front perspective view of a fourth embodiment 701 of the invention holding a typical sign 100. In this embodiment of the invention 701 three leg elements 702, 703, 715 are jointed together by three cross bar supports 704, 713, 714 to provide additional stability. In envisioned alternative embodiments additional leg element may be used as desirable in a like manner. Although in this embodiment, the cross bar supports 704, 713, 714 are shown as being single bars extending generally horizontally, alternatives cross bar supports comprising one or more bars or sections extending horizontally or at an angle between the leg elements 702, 703, 715 are envisioned as alternative cross bar supports. The cross bar supports 704, 712, 713 is joined 707, 708, 716 to the leg elements 702, 703, 715 by welds in the present embodiment, although alternative methods of joining such as adhesive, screws, bolt(s), clips and the like can be substituted without departing from the concept of this invention. Two holding portions 705, 706 are shown holding the sign in position. These holding portions 705, 706 are preferably extensions of the leg elements 702, 703, bent as show in further drawings in detail, to create a "clip-like" feature capable of hold a sign 100 in place. In the present embodiment of the invention the entire structure is composed of relatively small diameter, less than ½ inch, rod metal, typically steel, aluminum, iron or the like. In alternative embodiments of the invention, the structure of the invention may be composed of one or more materials including other metals and plastic and other synthetic composites. Similarly, while the sign stake of this invention 701 is presently sized as appropriate for relatively small, real estate or political sign sizes, in alternative embodiments, this invention may be sized as appropriate for much larger, or potentially smaller signs, such as bill boards and other commercial advertising signs. Although if the invention is sized for a billboard, clearly the diameter of the rod material used would be much larger than the less than 112 inch of the present embodiment.

Figure 7B:
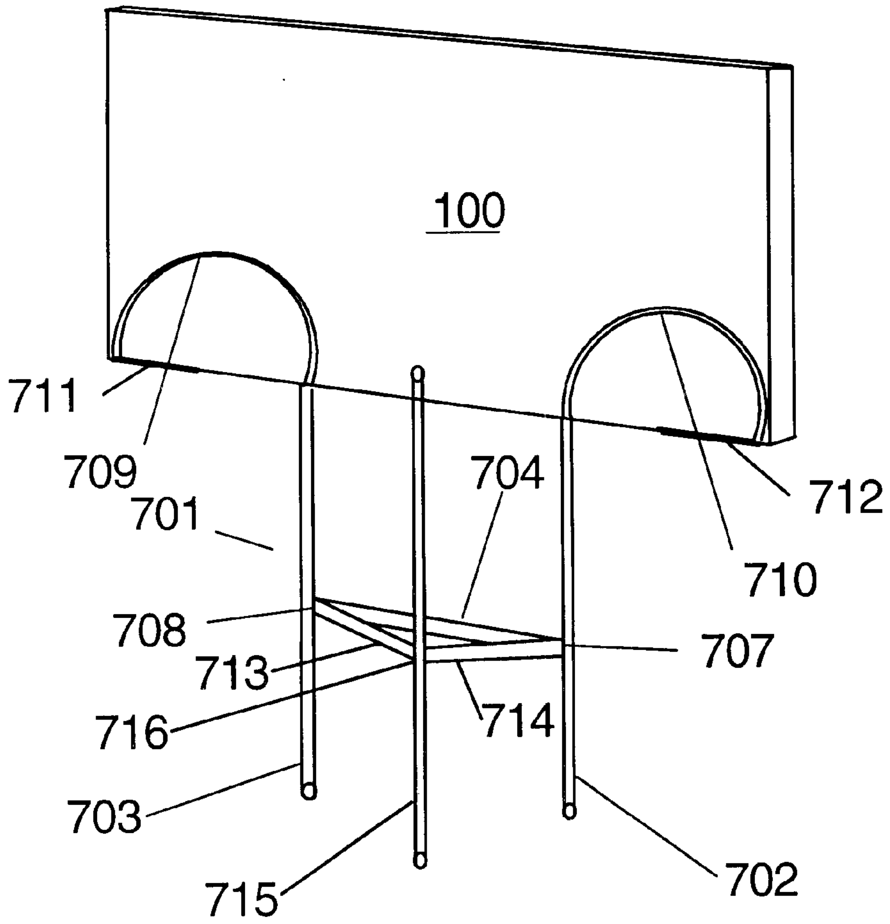
FIG. 7*b* is a rear perspective view of the fourth embodiment of the invention, holding a typical sign.

FIG. 7*b* is a rear perspective view of the fourth embodiment 701 of the invention, holding a typical sign 100. This view, while continuing to show the leg elements 702, 703, 715 also shows the rear of the holding elements each consisting of a curved portion 709, 710 and a connecting portion 711, 712. As can be seen in this view, the curved portions 709, 710 are an extension of the leg portions 702, 703 and the connecting portion 711, 712 is an extension of the curved portion 709, 710. The connecting portion 711, 712, (as further shown in FIG. 7*a*) extends into the holding portions 705, 706, shown in FIG. 7*a*. The sign 100 is held in place in one of two manners. In particular, this invention 701 is especially well suited to holding the sign 100 by compressive force between the holding portions 705, 706 and the curve portions 709, 710. Naturally, it is envisioned that in alternative embodiments of this particular embodiment the curved portions 709, 710 may be replaced with portions comprised of angled sections. This compressive force is created, in the present embodiment by bending the metal portions of the extended legs 702, 703 to create the curved portions 709, 710, the connecting portions 711, 712 and the holding portions 705, 706. In alternative embodiments, the compressive force can be created by molding or use of an internal wire or the like. In alternative uses, with corrugated or like signs have measurable width, the holding portions 705, 706, may be inserted into the corrugated or like region of the sign thereby frictionally holding the sign 100 in place.

Figure 8A:
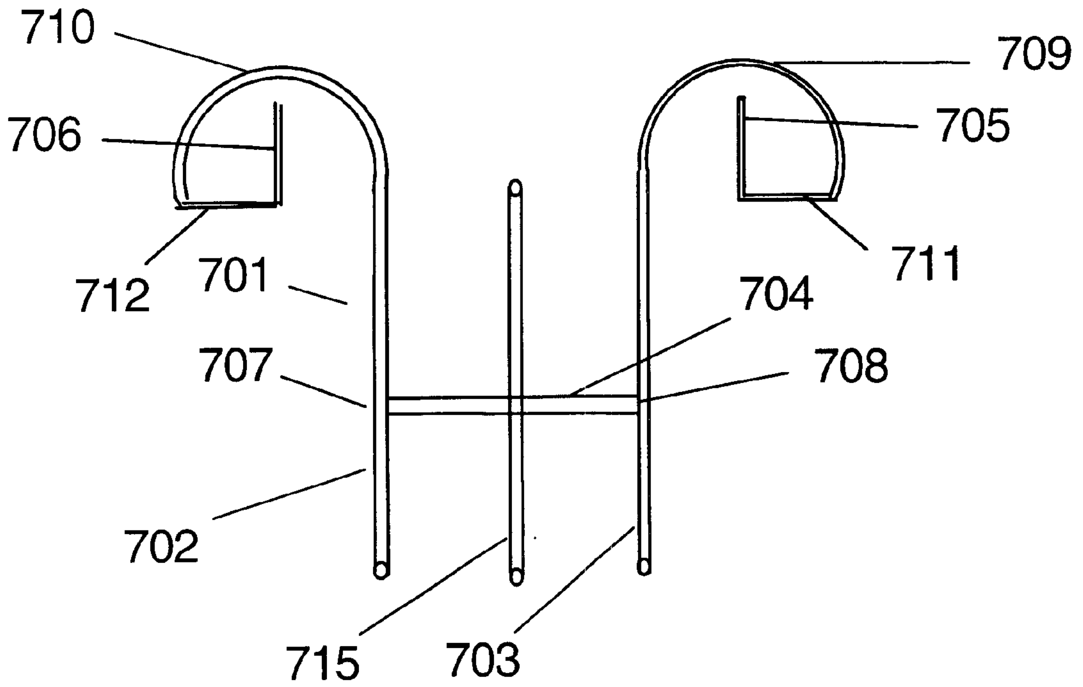
FIG. 8*a* is a front view of the fourth embodiment of the invention without showing a held sign.

FIG. 8*a* is a front view of the fourth embodiment 701 of the invention without showing a held sign in order to show all of the elements as connected together. The leg portions 702, 703, 715 are joined 707, 708, 716 together by the cross bar supports 704, 713, 714. The leg portions 702, 703 extend to curved portions 709, 710, which in turn extends to connecting portions 711, 712 and which extend to the holding portions 705, 706.

Figure 8B:
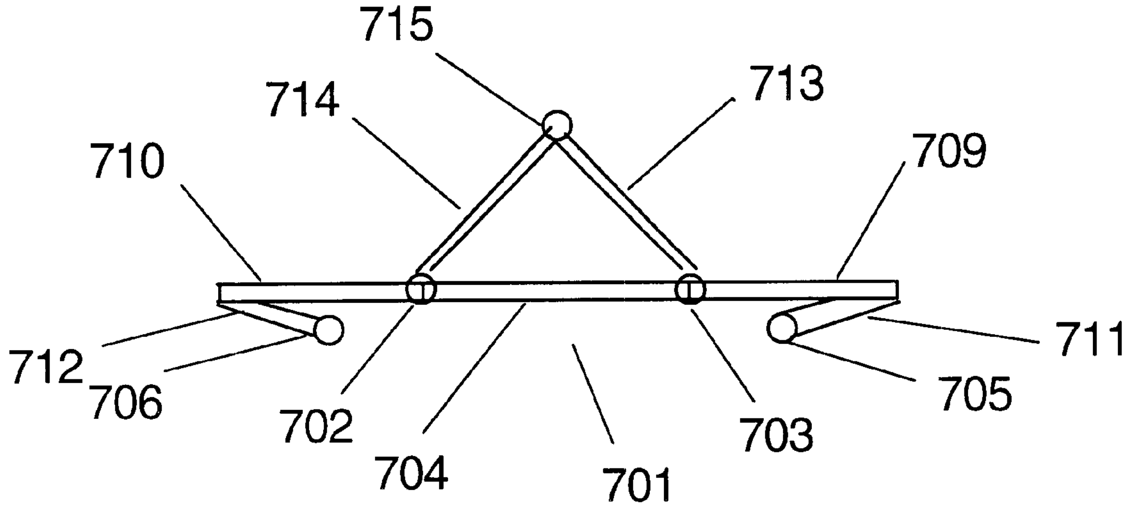
FIG. 8*b* is a top down view of the fourth embodiment of the invention without showing a held sign.

FIG. 8*b* is a top down view of the fourth embodiment 701 of the invention without showing a held sign. This view shows the relative positioning of the holding portions 705, 706 to the curved portions 709, 710 and shows the somewhat springlike bend created in the curved portions 709, 710 with the connecting portions 711, 712 and the holding portions 705, 706. As noted above, the sign 100, shown in FIGS. 7*a* and 7*b*, typically is fitted between the holding portions 705, 706 and the curved portions 709, 710.

It is to be understood that the above described and referenced embodiments and examples are merely illustrative of numerous and varied other embodiments and applications which may constitute applications of the principles of this invention. These example embodiments are not intended to be exhaustive or to limit the invention to the precise form, connection or choice of components, or materials disclosed herein as the present preferred embodiments. Obvious modifications or variations are possible and foreseeable in light of the above teachings. These embodiments of the invention were chosen and described to provide the best illustration of the principles of the invention and its practical application to thereby enable one of ordinary skill in the art to make and use the invention, without undue experimentation. Other embodiments may be readily devised by those skilled in the art without departing from the spirit or scope of this invention and it is the intent of the inventor that they be deemed to be within the scope of this invention, as determined by the appended claims when they are interpreted in accordance with the breadth to which they are fairly legally and equitably entitled.

What is claimed is:

1. A stake for holding a sign upright above the ground, comprising:

(A) a first leg element, having a first end and a second end;

(B) a second leg element, having a first end and a second end;

(C) a cross bar support joined to said first leg element and said second leg element;

(D) a first holding element, extending from said first end of said first leg element, adapted for holding a sign in place by compressively holding the sign; and (E) a second holding element, extending from said first end of said second leg element, adapted for holding a sign in place by compressively holding the sign.

2. A stake for holding a sign upright above the ground, as recited in claim 1, wherein said first holding element further comprises:

(1) a curved portion extending from said first end of said first leg;

(2) a connecting portion extending from said curved portion; and (3) a holding portion extending from said connecting portion.

3. A stake for holding a sign upright above the ground, as recited in claim 1, wherein said second holding element further comprises:

(1) a curved portion extending from said first end of said second leg;

(2) a connecting portion extending from said curved portion; and (3) a holding portion extending from said connecting portion.

4. A stake for holding a sign upright above the ground, as recited in claim 2, wherein said first holding element further comprises:

(1) an angled portion extending from said first end of said first leg;

(2) a connecting portion extending from said curved portion; and (3) a holding portion extending from said connecting portion.

5. A stake for holding a sign upright above the ground, as recited in claim 2, wherein said second holding element further comprises:

(1) an angled portion extending from said first end of said second leg;

(2) a connecting portion extending from said curved portion; and (3) a holding portion extending from said connecting portion.

6. A stake for holding a sign upright above the ground, as recited in claim 2, wherein said first holding element further comprises:

(1) a double angled portion extending from said first end of said first leg;

(2) a connecting portion extending from said curved portion; and (3) a holding portion extending from said connecting portion.

7. A stake for holding a sign upright above the ground, as recited in claim 2, wherein said second holding element further comprises:

(1) a double angled portion extending from said first end of said second leg;

(2) a connecting portion extending from said curved portion; and (3) a holding portion extending from said connecting portion.

8. A stake for holding a sign upright above the ground, as recited in claim 1, further comprising a third leg element for providing additional stability connected to said first leg element by a second cross bar support.

* * * * *